US012808018B2

(12) United States Patent
Baker et al.

(10) Patent No.: US 12,808,018 B2
(45) Date of Patent: Nov. 24, 2026

(54) TITANIUM-BASED ALLOY COMPOSITIONS, ADDITIVELY MANUFACTURED COMPONENTS THAT INCLUDE THE COMPOSITIONS, ADDITIVE MANUFACTURING SYSTEMS THAT UTILIZE THE COMPOSITIONS, AND METHODS OF ADDITIVELY MANUFACTURING ADDITIVELY MANUFACTURED COMPONENTS

(71) Applicant: The Boeing Company, Arlington, VA (US)

(72) Inventors: Andrew H. Baker, St. Louis, MO (US); Matthew J. Crill, Everett, WA (US); Joseph Fixter, Leeds (GB); Harshal N. Mathur, Mumbai (IN); Yining He, Changsha (CN); Shanoob Balachandran Nair, Woodstock (GB)

(73) Assignee: The Boeing Company, Arlington, VA (US)

( * ) Notice: Subject to any disclaimer, the term of this patent is extended or adjusted under 35 U.S.C. 154(b) by 464 days.

(21) Appl. No.: 18/489,696

(22) Filed: Oct. 18, 2023

(65) Prior Publication Data

US 2025/0129452 A1 Apr. 24, 2025

(51) Int. Cl.

| | |
|---|---|
| ***C22C 14/00*** | (2006.01) |
| ***B33Y 10/00*** | (2015.01) |
| ***B33Y 30/00*** | (2015.01) |
| ***B33Y 70/00*** | (2020.01) |

(52) U.S. Cl.

CPC .............. *C22C 14/00* (2013.01); *B33Y 10/00* (2014.12); *B33Y 30/00* (2014.12); *B33Y 70/00* (2014.12)

(58) Field of Classification Search

CPC ...................................................... C22C 14/00

See application file for complete search history.

(56) References Cited

U.S. PATENT DOCUMENTS 5,156,807 A * 10/1992 Nagata .................... C22C 14/00 148/421
2022/0316030 A1* 10/2022 Foltz, IV ................ C22C 14/00

FOREIGN PATENT DOCUMENTS

| | | | |
|---|---|---|---|
| CN | 112195367 | A | 1/2021 |
| CN | 115094270 | A | 9/2022 |
| EP | 0408313 | A1 | 1/1991 |
| JP | 03039432 | A | 2/1991 |

OTHER PUBLICATIONS

Wert, J. A., and N. E. Paton. "Enhanced superplasticity and strength in modified Ti—6Al—4V alloys." Metallurgical transactions A 14.12 (1983): 2535-2544.*

Das et al., "Effect of iron and nickel impurities on creep and tensile behaviour of Ti—24Al—20Nb—0.5Mo alloy," Materials Science and Engineering A 496, 2008.

European Patent Office, International Search Report and Written Opinion of the International Searching Authority in related PCT application No. PCT/US2024/051087, Feb. 5, 2025.

* cited by examiner

*Primary Examiner* — Christopher S Kessler

(74) *Attorney, Agent, or Firm* — Kolitch Romano Dascenzo Gates LLP

(57) ABSTRACT

Titanium-based alloy compositions, additively manufactured components that include the compositions, additive manufacturing systems that utilize the compositions, and methods of additively manufacturing additively manufactured components are disclosed herein. The compositions comprising at least 4 weight percent (wt %) and at most 6.5 wt % aluminum, at least 1.5 wt % and at most 4.5 wt % vanadium, at least 1.3 wt % and at most 2.1 wt % cobalt, metallic solutes, and titanium. The composition includes at most 4.5 wt % of the metallic solute, which includes at least two of tin, chromium, iron, copper, and nickel.

20 Claims, 7 Drawing Sheets

TITANIUM-BASED ALLOY COMPOSITIONS, ADDITIVELY MANUFACTURED COMPONENTS THAT INCLUDE THE COMPOSITIONS, ADDITIVE MANUFACTURING SYSTEMS THAT UTILIZE THE COMPOSITIONS, AND METHODS OF ADDITIVELY MANUFACTURING ADDITIVELY MANUFACTURED COMPONENTS

FIELD OF THE DISCLOSURE

The present disclosure relates generally to titanium-based alloy compositions, additively manufactured components that include the compositions, additive manufacturing systems that utilize the compositions, and methods of additively manufacturing additively manufactured components.

BACKGROUND OF THE DISCLOSURE

Additive manufacturing systems may be utilized to form and/or define an additively manufactured component from a feedstock material. In general, additively manufactured components are formed via a layer-by-layer methodology in which a subsequently formed layer of the additively manufactured component is defined on a previously formed portion of the additively manufactured component. For certain feedstock materials, this layer-by-layer methodology may produce additively manufactured components that exhibit one or more anisotropic material properties that vary with direction within the additively manufactured component. As an example, during additive manufacturing, metallic materials may exhibit the nucleation and growth of columnar microstructures along a direction that is perpendicular to planes within which the various layers are defined, i.e., perpendicular to the "build direction". These columnar microstructures lead to anisotropic behavior in material properties, i.e., properties vary with direction of applied stress with respect to the microstructure. This behavior, which may be prevalent when conventional titanium alloy compositions are utilized in additive manufacturing processes, may be undesirable for the performance requirements of certain additively manufactured components. Thus, there exists a need for improved titanium-based alloy compositions, additively manufactured components that include the compositions, additive manufacturing systems that utilize the compositions, and methods of additively manufacturing additively manufactured components.

SUMMARY OF THE DISCLOSURE

Titanium-based alloy compositions, additively manufactured components that include the compositions, additive manufacturing systems that utilize the compositions, and methods of additively manufacturing additively manufactured components are disclosed herein. The compositions consist essentially of at least 4 weight percent (wt %) and at most 6.5 wt % aluminum, at least 1.5 wt % and at most 4.5 wt % vanadium, at least 1.3 wt % and at most 2.1 wt % cobalt, a metallic solute, and titanium. The composition includes at most 4.5 wt % of the metallic solute, which includes at least two of tin, chromium, iron, copper, and nickel.

DETAILED DESCRIPTION AND BEST MODE OF THE DISCLOSURE

FIGS. 1-12 provide examples of titanium-based alloy compositions 10, of properties of titanium-based alloy compositions 10, of additively manufactured components 100, of additive manufacturing systems 200, and/or of methods, according to the present disclosure. Elements, components, and/or features that are discussed herein with reference to one or more of FIGS. 1-12 may be included in and/or utilized with any of FIGS. 1-12 without departing from the scope of the present disclosure. In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 1:
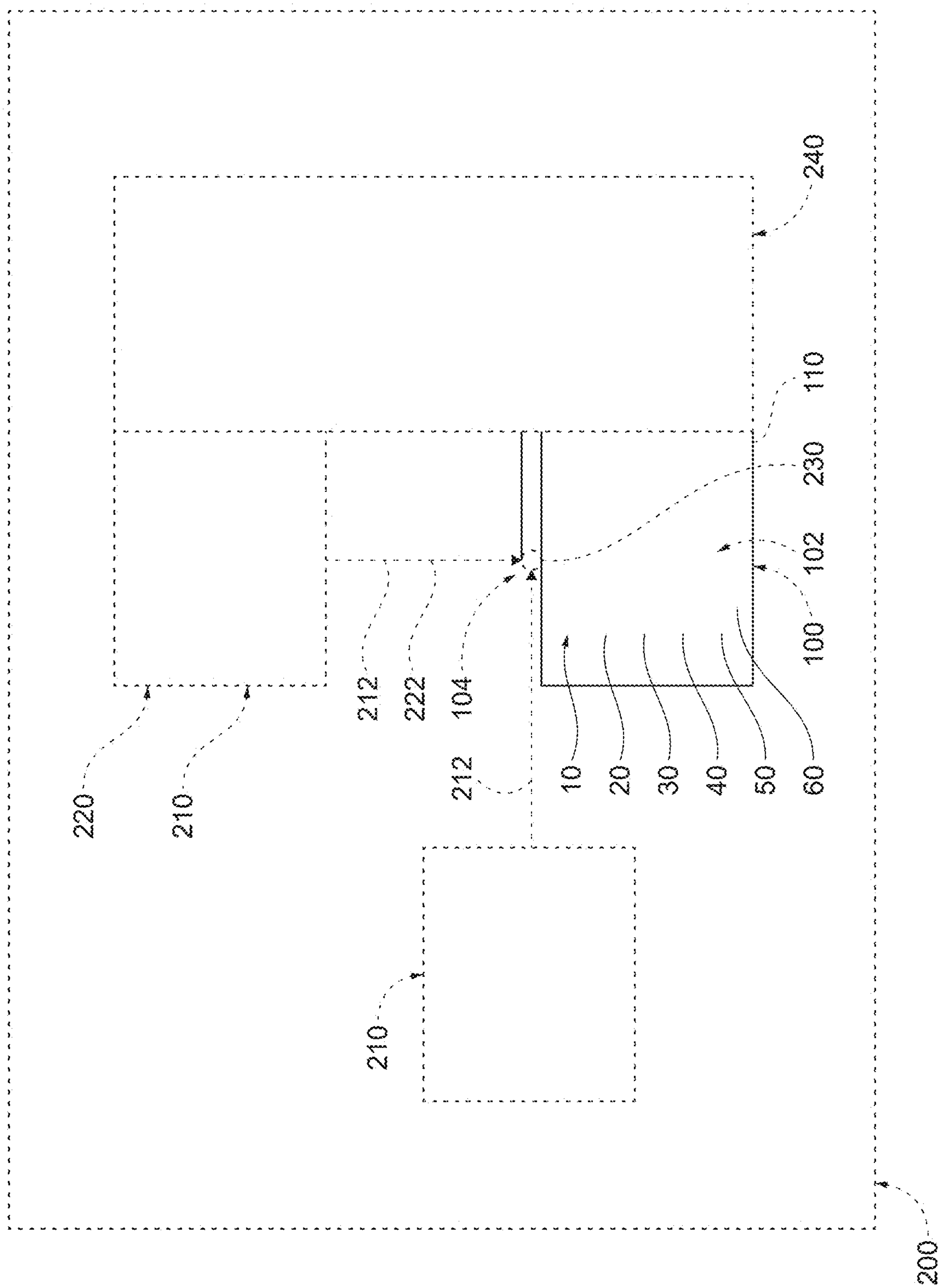
FIG. 1 is a schematic illustration of examples of additive manufacturing systems according to the present disclosure.

FIG. 1 is a schematic illustration of examples of additive manufacturing systems 200 according to the present disclosure. Additive manufacturing systems 200 may be utilized to form and/or define an additively manufactured component 100 utilizing titanium-based alloy compositions 10, according to the present disclosure. Additive manufacturing systems 200, which also may be referred to herein as systems 200, includes a supply 210 of a feedstock material 212, which includes, consists of, or consists essentially of titanium-based alloy compositions 10, according to the present disclosure. Systems 200 also include an energy source 220 and a scanning structure 240. Energy source 220 is configured to selectively melt a melted fraction of feedstock material 212, such as via supply of energy 222 to the melted fraction of the feedstock material, to form and/or define a melt pool 230 of feedstock material 212 at an addition location 104. Melt pool 230 subsequently will cool and/or solidify to define a corresponding region of additively manufactured component 100. Scanning structure 240 is configured to selectively change a location of melt pool 230 relative to a previously formed portion 102 of additively manufactured component 100, such as to permit and/or to facilitate addition to previously formed portion 102 and/or build-up of additively manufactured component 100 with a specified shape and/or geometry.

With the above in mind, a method of operating additive manufacturing systems 200, which also may be referred to herein as a method of additively manufacturing additively manufactured component 100, may include melting a melted fraction of feedstock material 212 to form melt pool 230 of the feedstock material. The method also may include cooling melt pool 230 to define a corresponding region of additively manufactured component 100. The method further may include selectively varying a location of melt pool 230, relative to previously formed portion 102 of additively manufactured component 100, to define, or to fully define, the additively manufactured component.

Supply 210 may include and/or be any suitable structure that may be adapted, configured, designed, and/or constructed to contain feedstock material 212 and/or to position feedstock material 212 at addition location 104. Examples of supply 210 include a powder supply system configured to supply feedstock material 212 in the form of a powder and/or a wire feeder configured to supply feedstock material 212 in the form of a wire.

As illustrated in FIG. 1, and in some examples, supply 210 may be separate, may be distinct, and/or may be spaced-apart from energy source 220. Stated differently, systems 200 may be configured separately to provide feedstock material 212 and energy 222 to addition location 104. Alternatively, and as also illustrated in FIG. 1, supply 210 may be at least partially coextensive with energy source 220. Stated differently, systems 200 may be configured to provide feedstock material 212 and energy 222 to addition location 104 together, such as via utilizing feedstock material 212 as a conduit that also provides energy 222.

Energy source 220 may include and/or be any suitable structure that may be adapted, configured, designed, and/or constructed to provide energy 222 to addition location 104. Examples of energy source 220 include an electric power supply, an AC electric power supply, a DC electric power supply, a heater, and/or a laser. Similarly, energy 222 may include and/or be any energy that may be utilized to melt feedstock material 212 and/or to define melt pool 230. Examples of energy 222 include electrical energy, an AC electric current, a DC electric current, thermal energy, electromagnetic radiation, and/or a laser beam.

Scanning structure 240 may include and/or be any suitable structure that may be adapted, configured, designed, and/or constructed to selectively change the location of melt pool 230. Examples of scanning structure 240 include a linear actuator, a rotary actuator, a rack and pinion assembly, a lead screw and nut assembly, a ball screw and nut assembly, a motor, an electric motor, a stepper motor, a servo motor, and/or a piezoelectric positioner.

Additive manufacturing systems 200 may include and/or be any suitable system that includes supply 210, energy source 220, and scanning structure 240 and/or that is adapted, configured, designed, and/or constructed to form and/or define additively manufactured component 100. Examples of additive manufacturing systems 200 include a directed energy deposition system, a wire feed system, a powder feed system, and/or a powder bed fusion system.

Additively manufactured component 100 may include and/or be any suitable structure that may be formed and/or defined from feedstock material 212, that includes, consists of, or consists essentially of titanium-based alloy compositions 10, and/or that may be formed and/or defined utilizing systems 200. An example of additively manufactured component 100 includes a component of an aircraft 110. Conventional aircraft components may utilize conventional titanium-based alloys; however, as discussed in more detail herein, titanium-based alloy compositions 10, according to the present disclosure, may provide a number of distinct benefits over conventional titanium-based alloys, especially when utilized within systems 200 and/or to define additively manufactured component 100.

With continued reference to FIG. 1, titanium-based alloy compositions 10, which also may be referred to herein as compositions 10, include, comprise, consist of, or consist essentially of aluminum 20, vanadium 30, cobalt 40, a metallic solute 50, and titanium 60. The metallic solute includes two or more components selected from the group consisting of tin, chromium, iron, copper, and nickel.

Compositions 10 include at least 4 weight percent (wt %) and at most 6.5 wt % aluminum 20. In more specific examples, compositions 10 may include at least 4.25 wt %, at least 4.5 wt %, at least 4.75 wt %, at least 5 wt %, at least 5.25 wt %, at least 5.5 wt %, at most 6.25 wt %, at most 6 wt %, at most 5.75 wt %, at most 5.5 wt %, at most 5.25 wt %, and/or at most 5 wt % aluminum 20.

Compositions 10 include at least 1.5 wt % and at most 4.5 wt % vanadium 30. In more specific examples, compositions 10 may include at least 1.75 wt %, at least 2 wt %, at least 2.25 wt %, at least 2.5 wt %, at least 2.75 wt %, at least 3 wt %, at least 3.25 wt %, at least 3.5 wt %, at most 4.25 wt %, at most 4 wt %, at most 3.75 wt %, at most 3.5 wt %, at most 3.25 wt %, at most 3 wt %, at most 2.75 wt %, and/or at most 2.5 wt % vanadium 30.

Compositions 10 include at least 1.3 wt % and at most 2.1 wt % cobalt 40. In more specific examples, compositions 10 may include at least 1.35 wt %, at least 1.4 wt %, at least 1.5 wt %, at least 1.6 wt %, at least 1.65 wt %, at most 2 wt %, at most 1.9 wt %, at most 1.8 wt %, at most 1.7 wt %, at most 1.65 wt %, and/or at most 1.6 wt % cobalt 40.

Compositions 10 include at most 4.5 wt % of metallic solute 50 and may include at least three, at least four, or all of tin, chromium, iron, copper, and nickel. In more specific examples, compositions 10 may include at least 1.2 wt %, at least 1.4 wt %, at least 1.6 wt %, at least 1.8 wt %, at least 2 wt %, at least 2.2 wt %, at least 2.35 wt %, at least 2.4 wt %, at least 2.6 wt %, at least 2.8 wt %, at least 3 wt %, at least 3.2 wt %, at least 3.4 wt %, at least 3.5 wt %, or at least 3.6 wt % of metallic solute 50. Additionally or alternatively, compositions 10 may include at most 4.4 wt %, at most 4.2 wt %, at most 4 wt %, at most 3.8 wt %, at most 3.6 wt %, at most 3.4 wt %, at most 3.35 wt %, at most 3.2 wt %, at most 3 wt %, at most 2.8 wt %, at most 2.6 wt %, at most 2.4 wt %, at most 2.2 wt %, or at most 2 wt % of metallic solute 50.

When metallic solute 50 includes tin, compositions 10 may include at least 0.01 wt %, at least 0.05 wt %, at least 0.1 wt %, at least 0.2 wt %, at least 0.4 wt %, at least 0.6 wt %, at least 0.8 wt %, at least 1 wt %, at least 1.2 wt %, at least 1.4 wt %, at least 1.6 wt %, at least 1.8 wt %, at least 2 wt %, at least 2.2 wt %, at least 2.4 wt %, at least 2.6 wt %, or at least 2.8 wt % tin. Additionally or alternatively, compositions 10 may include at most 3.2 wt %, at most 3 wt %, at most 2.8 wt %, at most 2.6 wt %, at most 2.4 wt %, at most 2.2 wt %, at most 2 wt %, at most 1.8 wt %, at most 1.6 wt %, at most 1.4 wt %, or at most 1.2 wt % tin.

When metallic solute 50 includes chromium, compositions 10 may include at least 0.01 wt %, at least 0.05 wt %, at least 0.1 wt %, at least 0.2 wt %, at least 0.4 wt %, at least 0.6 wt %, at least 0.7 wt %, at least 0.8 wt %, at least 1 wt %, at least 1.2 wt %, at least 1.4 wt %, at least 1.6 wt %, or at least 1.8 wt % chromium. Additionally or alternatively, compositions 10 may include at most 2.2 wt %, at most 2 wt %, at most 1.8 wt %, at most 1.6 wt %, at most 1.4 wt %, at most 1.3 wt %, or at most 1.2 wt % chromium.

When metallic solute 50 includes iron, compositions 10 may include at least 0.01 wt %, at least 0.05 wt %, at least 0.1 wt %, at least 0.2 wt %, at least 0.3 wt %, at least 0.4 wt %, at least 0.5 wt %, at least 0.6 wt %, at least 0.65 wt %, at least 0.7 wt % iron. Additionally or alternatively, compositions 10 may include at most 1 wt %, at most 0.95 wt %, at most 0.9 wt %, at most 0.8 wt %, at most 0.7 wt %, or at most 0.6 wt %, at most 0.5 wt %, and/or at most 0.4 wt % iron.

When metallic solute 50 includes copper, compositions 10 may include at least 0.01 wt %, at least 0.05 wt %, at least 0.1 wt %, at least 0.15 wt %, at least 0.2 wt %, at least 0.3 wt %, at least 0.4 wt %, at least 0.45 wt %, or at least 0.5 wt % copper. Additionally or alternatively, compositions 10 may include at most 0.8 wt %, at most 0.75 wt %, at most 0.7 wt %, at most 0.6 wt %, at most 0.5 wt %, at most 0.45 wt %, or at most 0.4 wt % copper.

When metallic solute 50 includes nickel, compositions 10 may include at least 0.01 wt %, at least 0.05 wt %, at least 0.1 wt %, at least 0.2 wt %, at least 0.3 wt %, or at least 0.4 wt % nickel. Additionally or alternatively, compositions 10 may include at most 0.8 wt %, at most 0.7 wt %, at most 0.6 wt %, or at most 0.5 wt % nickel.

Compositions 10 may include any suitable amount and/or weight fraction titanium. As an example, the balance of compositions 10 may be titanium or titanium and incidental impurities. As another example, compositions 10 may include at least 83.5 wt % titanium and/or at most 90.5 wt % titanium. In more specific examples, compositions 10 may include at least 84 wt %, at least 84.5 wt %, at least 85 wt %, at least 85.5 wt %, at least 86 wt %, at least 86.5 wt %, at least 87 wt %, or at least 87.5 wt % titanium. Additionally or alternatively, compositions 10 may include at most 90 wt %, at most 89.5 wt %, at most 89 wt %, at most 88.5 wt %, at most 88 wt %, at most 87.5 wt %, or at most 87 wt % titanium.

In a first more specific example of compositions 10, which also may be referred to herein as AMCET-1, metallic solute 50 includes chromium and iron. In such examples, compositions 10 include at least 0.8 wt % chromium and/or at most 1.2 wt % chromium and at least 0.65 wt % iron and/or at most 0.95 wt % iron. In some such examples, compositions 10 also include at least 0.15 wt % copper and at most 0.45 wt % copper, at least 3.5 wt % vanadium, at least 1.35 wt % cobalt and at most 1.65 wt % cobalt, and/or at least 5.5 wt % aluminum.

In a second more specific example of compositions 10, which also may be referred to herein as AMCET-2, metallic solute 50 includes chromium and iron. In such examples, compositions 10 include at least 1.8 wt % chromium and/or at most 2.2 wt % chromium and at least 0.1 wt % iron and/or at most 0.4 wt % iron. In some such examples, compositions 10 also include at least 0.45 wt % copper and/or at most 0.75 wt % copper, at least 2.5 wt % vanadium and/or at most 3.5 wt % vanadium, at least 1.35 wt % cobalt and/or at most 1.65 wt % cobalt, and/or at most 5 wt % aluminum.

In a third more specific example of compositions 10, which also may be referred to herein as AMCET-3, metallic solute 50 includes tin and chromium. In such examples, compositions 10 include at least 2.8 wt % tin and/or at most 3.2 wt % tin and at least 0.7 wt % chromium and/or at most 1.3 wt % chromium. In some such examples, compositions 10 also include at most 5.25 wt % aluminum, at least 3.5 wt % vanadium, and/or at least 1.5 wt % cobalt.

In a fourth more specific example of compositions 10, which also may be referred to herein as AMCET-4, metallic solute 50 includes tin and nickel. In such examples, compositions 10 include at least 0.8 wt % tin and/or at most 1.2 wt % tin and at least 0.4 wt % nickel and/or at most 0.8 wt % nickel. In some such examples, compositions 10 also include at least 5.5 wt % aluminum, at most 2.5 wt % vanadium, and/or at most 1.7 wt % cobalt.

Figure 2:
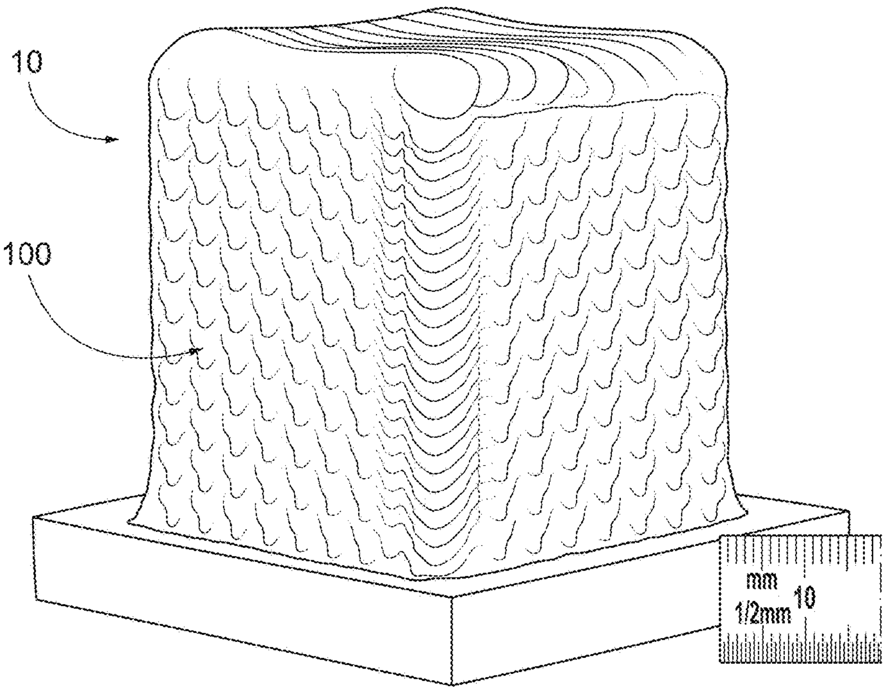
FIG. 2 is an image illustrating an example of an additively manufactured component according to the present disclosure.
Figure 3:
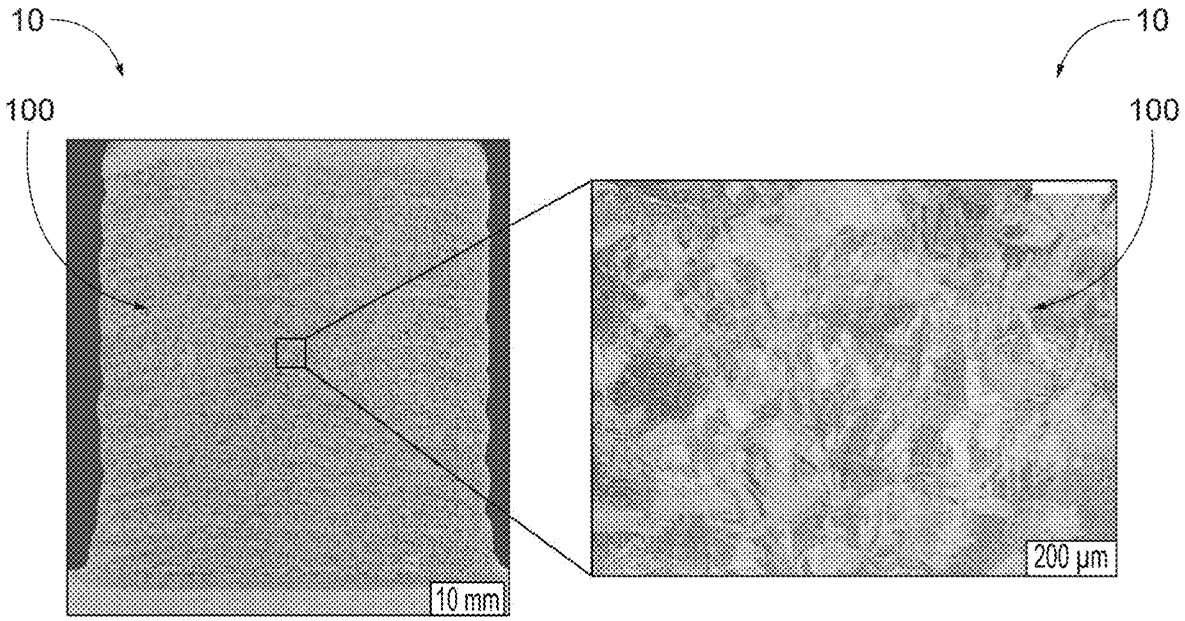
FIG. 3 illustrates examples of a microstructure of the additively manufactured component of FIG. 2.

FIG. 2 is an image illustrating an example of an additively manufactured component 100 formed utilizing compositions 10, according to the present disclosure. FIG. 3 illustrates examples of a microstructure of additively manufactured component 100 of FIG. 2, and FIG. 4 illustrates additional examples of additively manufactured microstructures from lab-scale samples subjected to laser remelting, representing additively manufactured components 100 that include alloy compositions 10, according to the present disclosure.

In general, and as illustrated, compositions 10 define additively manufactured components 100, in the form of metallic solids, that exhibit an equiaxed, or at least substantially equiaxed, microstructure. As collectively illustrated by FIGS. 2-4, additively manufactured components 100 exhibit a low occurrence of voids, which may be caused by solidification shrinkage, and/or large intermetallics. As illustrated by FIGS. 3-4, metallic domains within additively manufactured components 100 formed utilizing compositions 10 are relatively uniform and/or isotropic.

Figure 5:
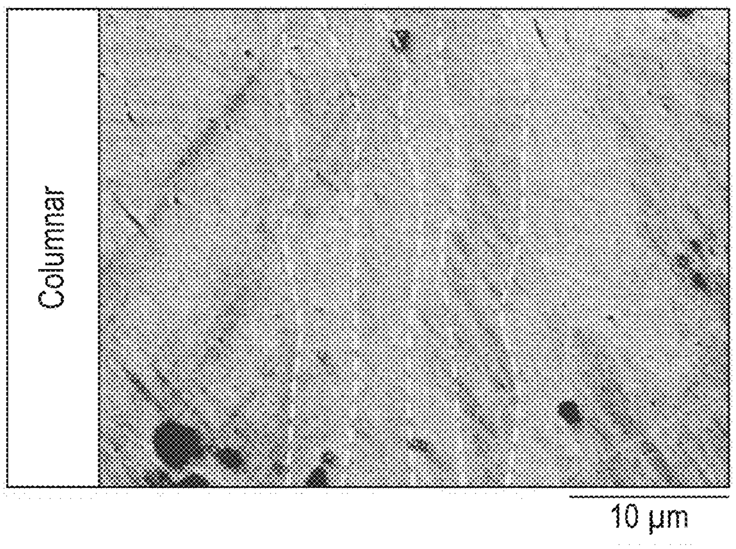
FIG. 5 (PRIOR ART)
FIG. 5 illustrates examples of columnar microstructures produced at lab-scale that may be created when conventional titanium alloy compositions are utilized within additive manufacturing processes.

In contrast, and as illustrated in FIG. 5, when conventional titanium alloy compositions are utilized within additive manufacturing processes, columnar microstructures generally are observed. The presence of columnar microstructures produces anisotropic material properties, which also may be unacceptable for certain applications.

Figure 4:
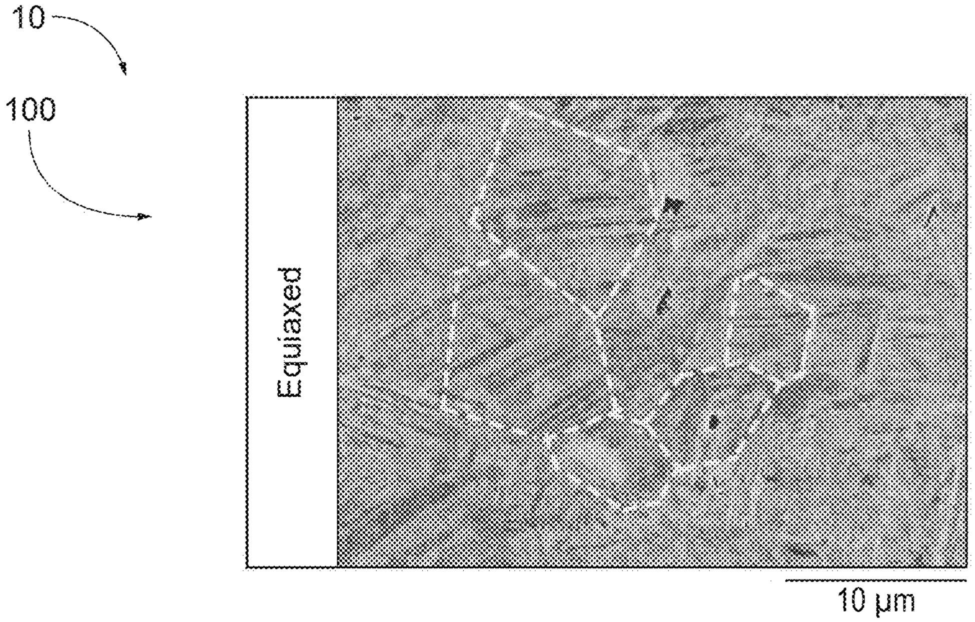
FIG. 4 illustrates additional examples of additively manufactured microstructures produced at lab-scale include alloy compositions, according to the present disclosure.
Figure 6:
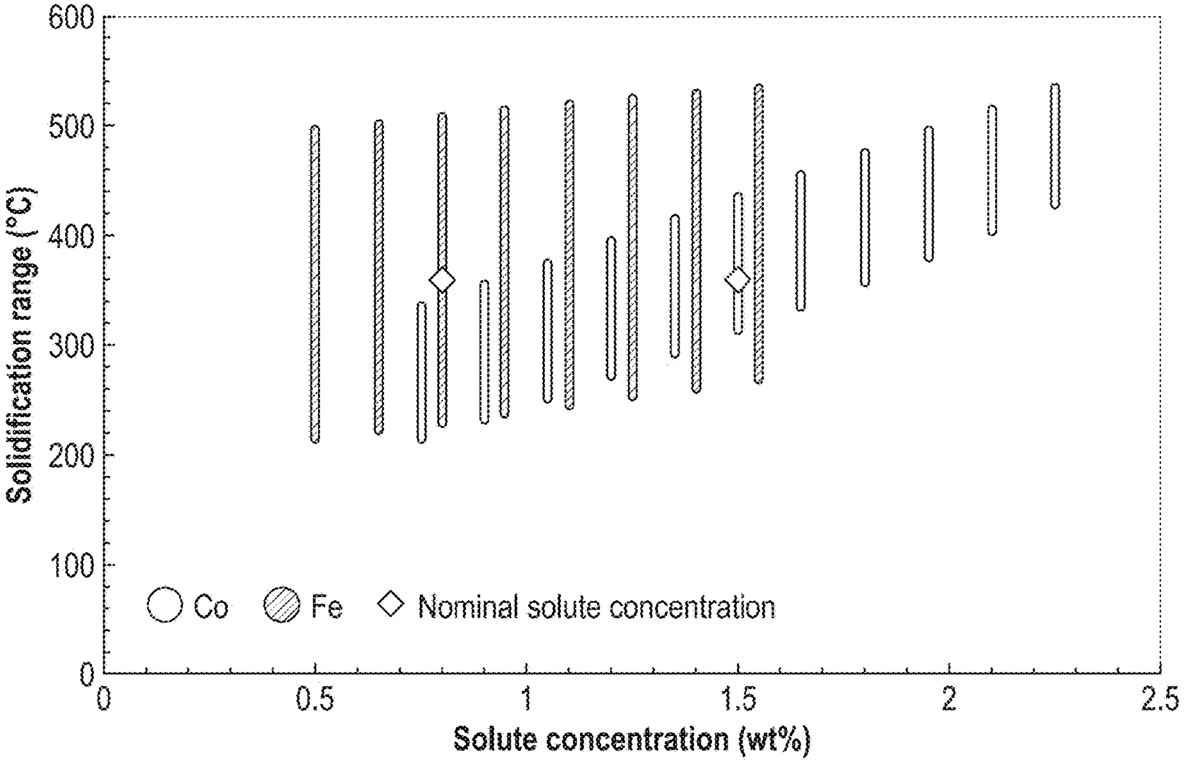
FIG. 6 is a plot illustrating examples of solidification temperature as a function of cobalt and iron content utilized to determine alloy compositions according to the present disclosure.
Figure 7:
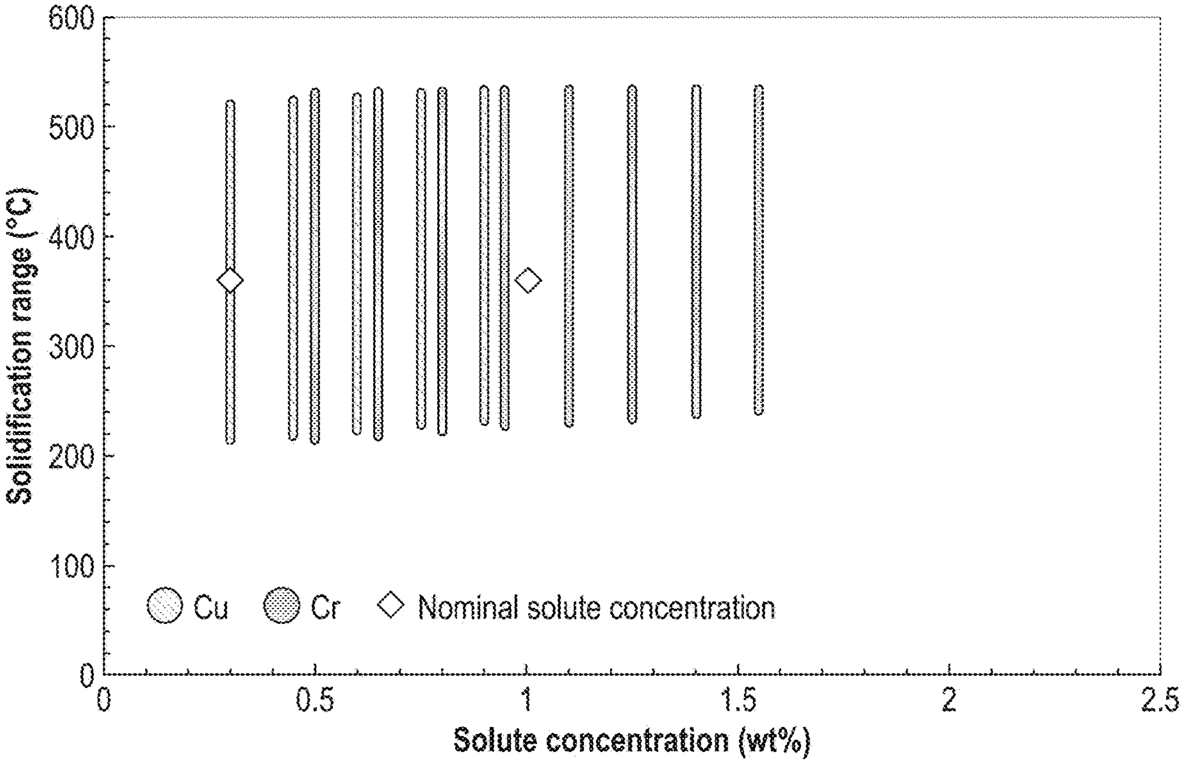
FIG. 7 is a plot illustrating examples of solidification temperature as a function of copper and chromium content utilized to determine alloy compositions according to the present disclosure.

In addition to providing the improved microstructure that is illustrated by FIGS. 3-5, thereby producing improved additively manufactured components 100 when compared to conventional titanium-based alloy compositions, compositions 10 were selected to be readily utilized within additive manufacturing processes. As an example, and as illustrated in FIGS. 6-7, solidification temperature range was analyzed as a function of metallic solute concentration for cobalt and iron (i.e., in FIG. 6) and also for copper and chromium (i.e., in FIG. 7) for AMCET-1. Preferred and/or nominal metallic solute concentration ranges then were selected that also provided a desired solidification temperature range of approximately 350° C. As illustrated in FIG. 6, the solidification temperature range is largely a function of cobalt concentration and only weakly a function of iron concentration. Copper and chromium concentrations do not have a significant impact on the solidification temperature range.

Figure 8:
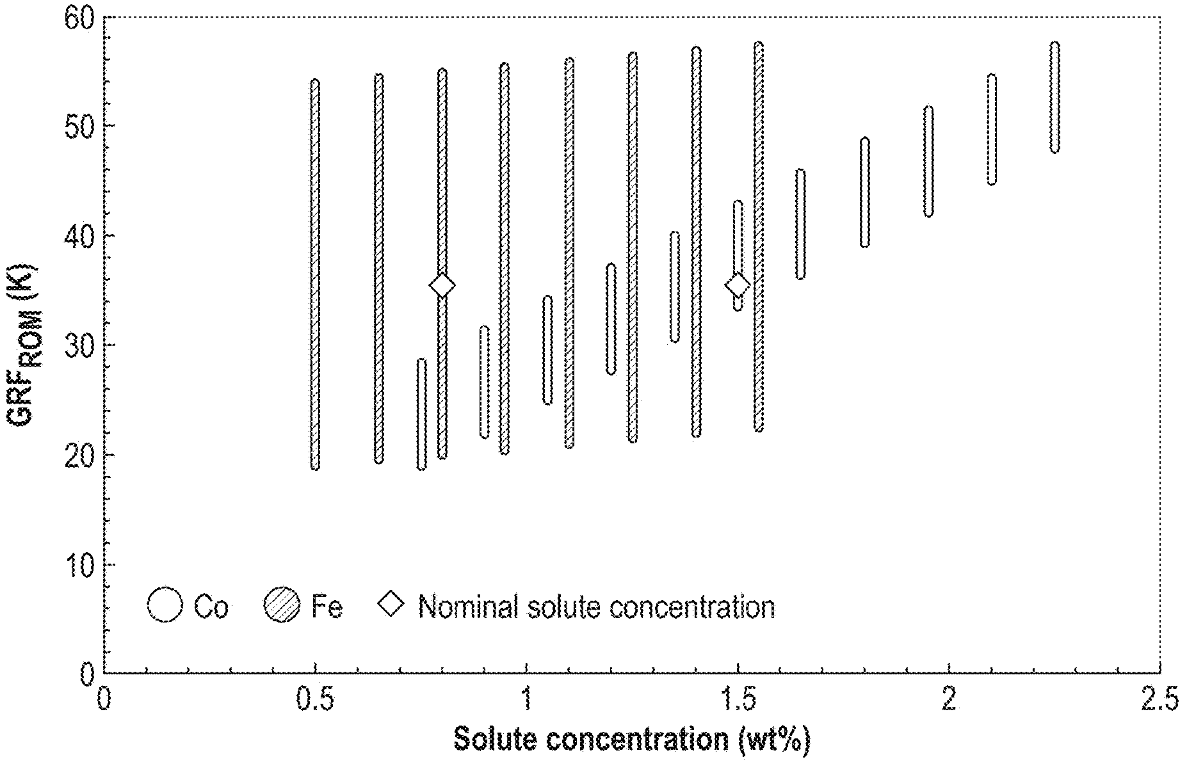
FIG. 8 is a plot illustrating examples of a growth restriction factor as a function of cobalt and iron content utilized to determine alloy compositions according to the present disclosure.
Figure 9:
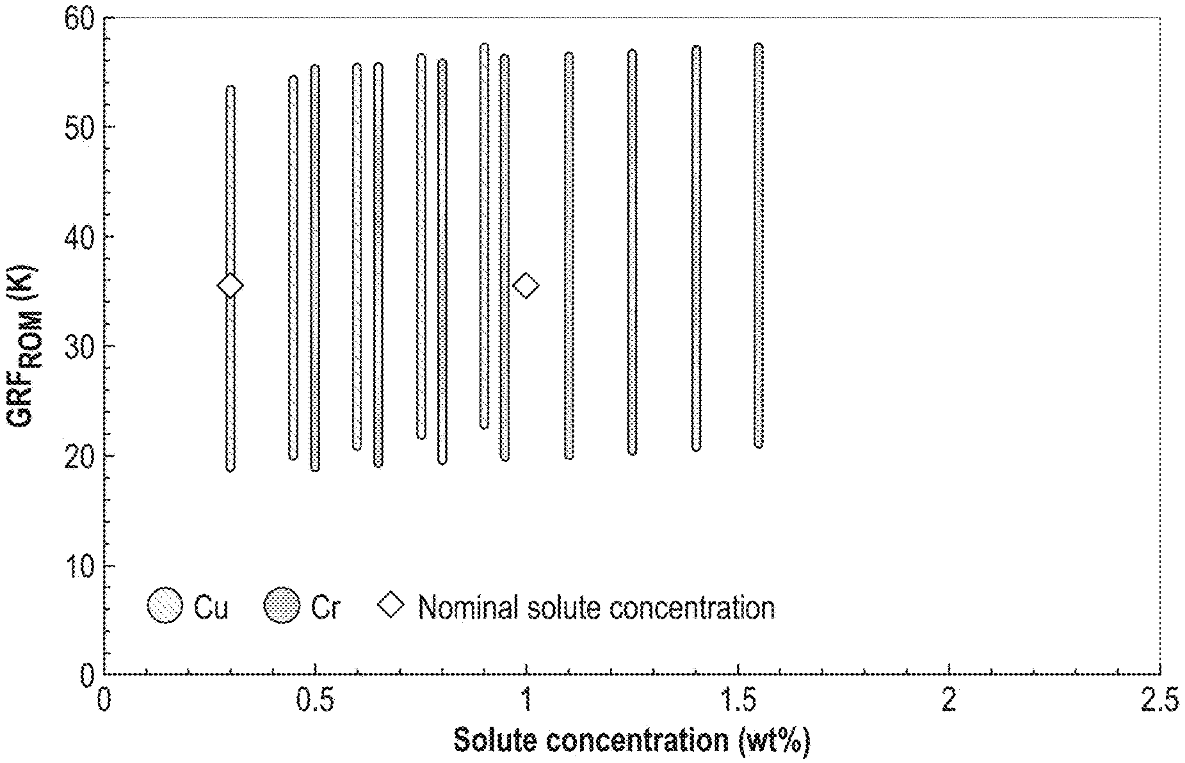
FIG. 9 is a plot illustrating examples of a growth restriction factor as a function of copper and chromium content utilized to determine alloy compositions according to the present disclosure.

The impact of metallic solute concentration on growth restriction factor also was analyzed and is illustrated in FIGS. 8-9. During solidification, solutes in the melt pool partition differently between the solid and liquid phases, which results in either accumulation or depletion of these solutes at the solid/liquid interface. This partitioning of solutes slows the growth rate of the solidifying phase, which is quantified as the growth restriction factor (GRF). In FIGS. 8-9, the GRF of an alloy has been calculated by summation of GRF values for Ti binaries of the individual constituent solutes according to Equation (1):

$$GRF_{Ti-6Al-4V-2Ni} = (6 \cdot GRF_{Ti-Al}) + (4 \cdot GRF_{Ti-V}) + (2 \cdot GRF_{Ti-Ni}) \quad (1)$$

where $GRF_{Ti-Al}$ is the growth restriction factor for a titanium-aluminum binary mixture, $GRF_{Ti-V}$ is the growth restriction factor for a titanium-vanadium binary mixture, and $GRF_{Ti-Ni}$ is the growth restriction factor for a titanium-nickel binary mixture. In general, a higher magnitude for GRF correlates with an increased potential for uniform, equiaxed, and/or isotropic microstructure within additively manufactured components. As illustrated in FIGS. 8-9, GRF is primarily a function of cobalt concentration and only a weak function of copper concentration. Iron and chromium do not appear to have a significant impact on GRF.

Figure 10:
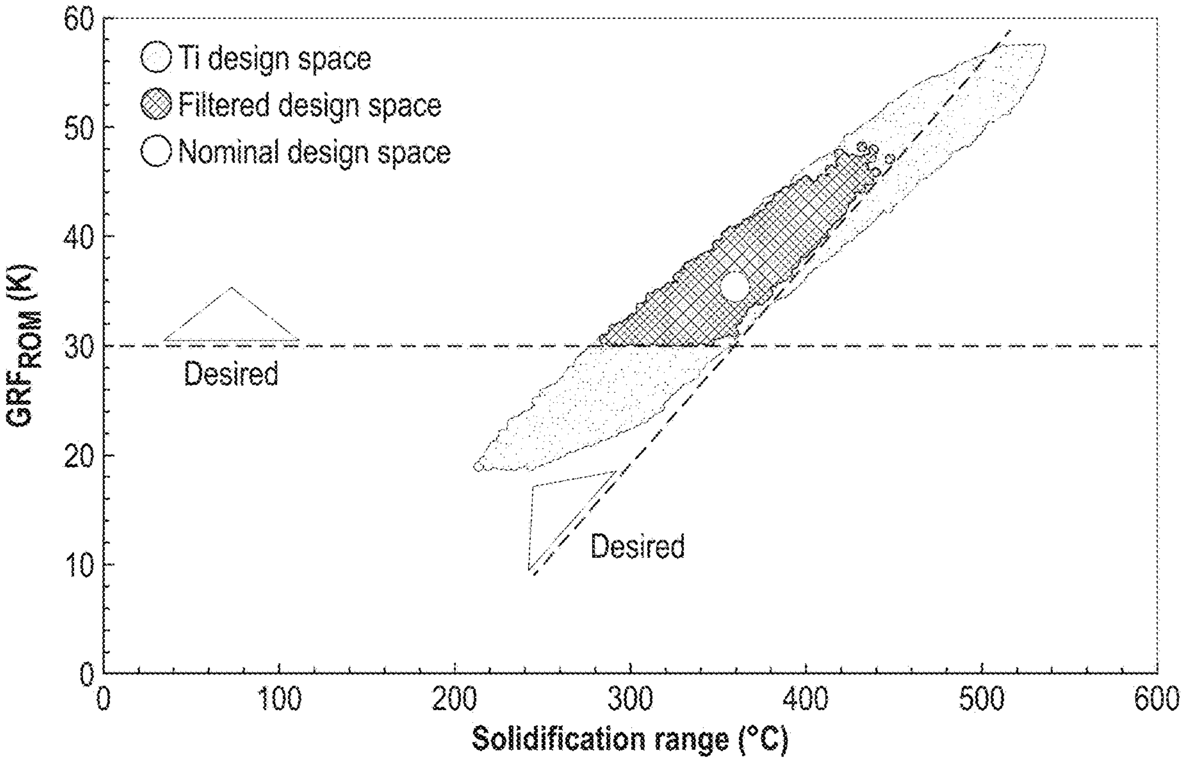
FIG. 10 is a plot illustrating examples of a growth restriction factor as a function of solidification temperature range for an alloy composition according to the present disclosure.

FIG. 10 is a plot illustrating examples of a growth restriction factor as a function of solidification temperature range for compositions 10 according to the present disclosure, namely AMCET-1. A minimum threshold GRF of 30 was utilized, together with a minimum threshold proportionality between GRF and solidification temperature range, to filter for compositions 10 that are expected to produce equiaxed microstructures.

Figure 11:
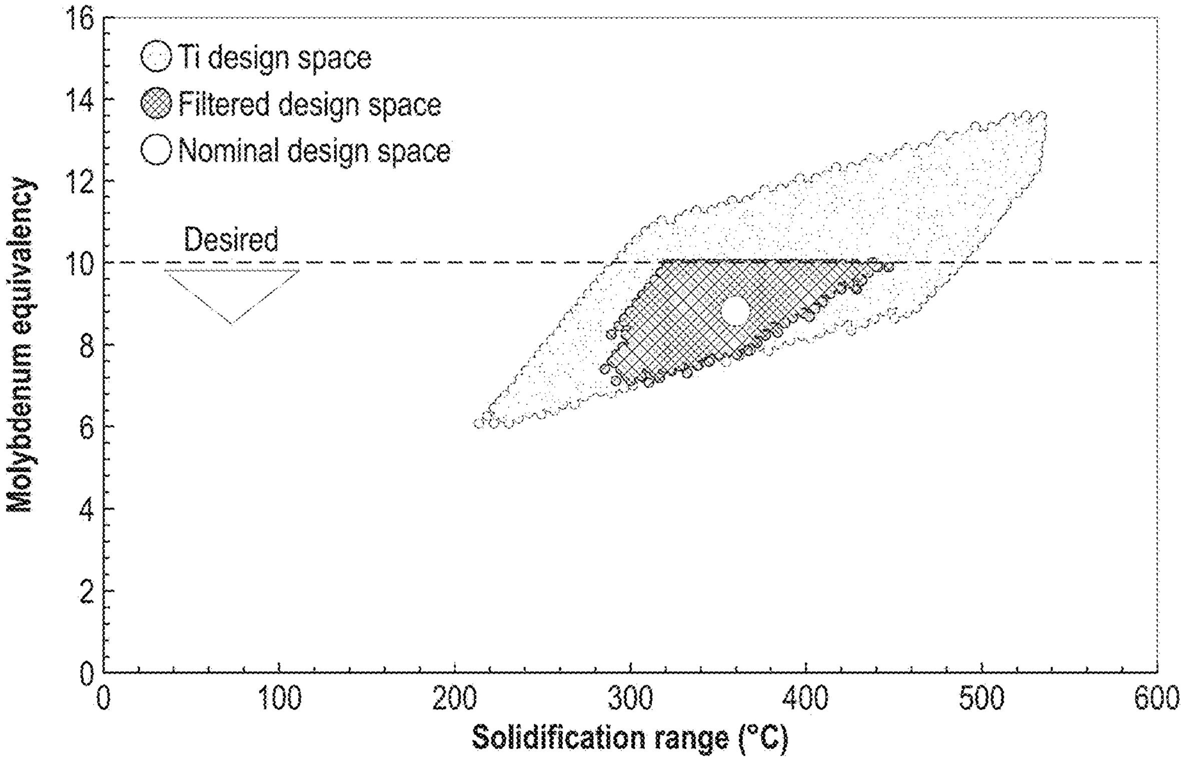
FIG. 11 is a plot illustrating examples of molybdenum equivalency as a function of solidification temperature range for an alloy composition according to the present disclosure.

FIG. 11 is a plot illustrating examples of molybdenum equivalency as a function of solidification temperature range for compositions 10 according to the present disclosure. A threshold molybdenum equivalency of 10 was selected, as compositions 10 with molybdenum equivalencies less than this magnitude are likely to produce additively manufactured components with preferred $\alpha+\beta$ phase structure.

Figure 12:
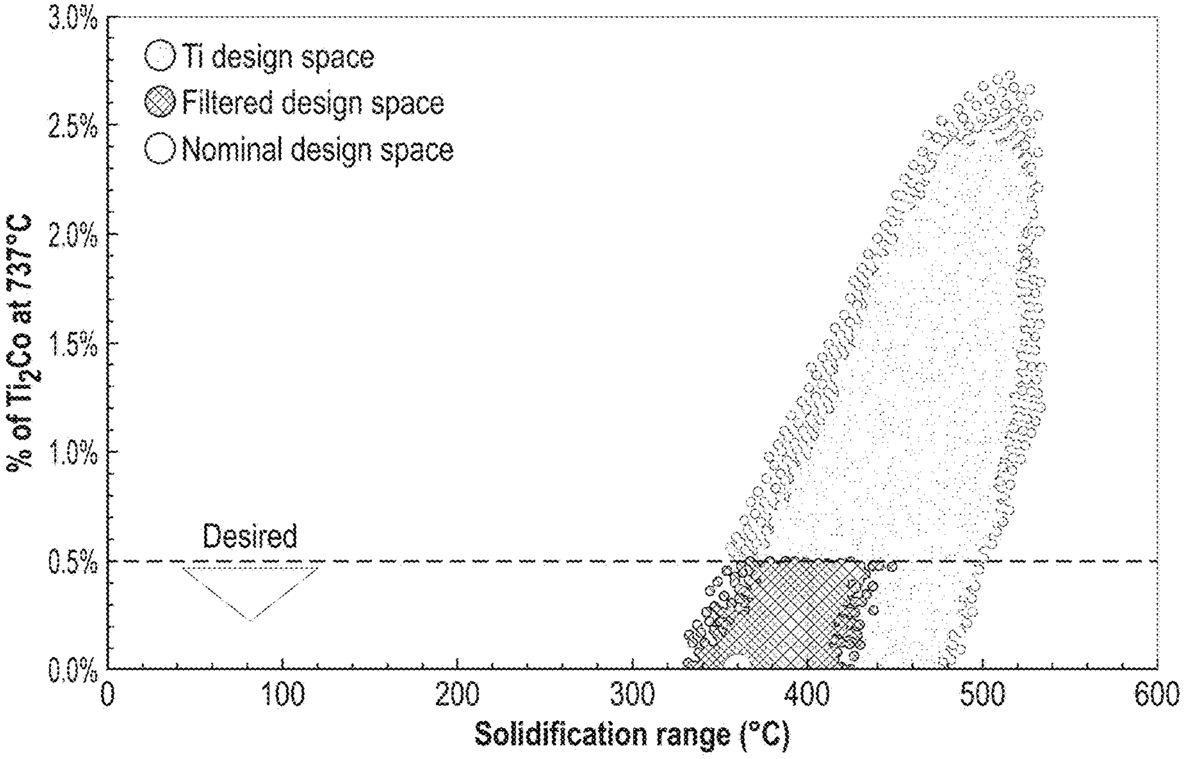
FIG. 12 is a plot illustrating examples of a percentage $Ti_2Co$ intermetallics as a function of solidification temperature range for an alloy composition according to the present disclosure.

FIG. 12 is a plot illustrating examples of a percentage $Ti_2Co$ intermetallics as a function of solidification temperature range for compositions 10 according to the present disclosure. The presence of brittle $Ti_2Co$ intermetallics may be detrimental to the microstructure and properties of the additively manufactured components. Thus, a maximum threshold of 0.5% was utilized.

Based upon the above analyses, a filtered set of composition ranges was selected. This is indicated in FIGS. 10-12, and only compositions that meet the selected criteria for GRF, molybdenum equivalency, and $Ti_2Co$ intermetallics are included. From this filtered set of composition ranges, a nominal composition 10 was selected, as indicated. Additively manufactured components 100 formed from the selected nominal composition 10 exhibit a high propensity to form equiaxed, or at least substantially equiaxed, microstructures, due to application of the GRF criteria, exhibits the preferred $\alpha+\beta$ phase structure due to application of the molybdenum equivalency criteria, and exhibits a low concentration of $Ti_2Co$ intermetallics due to application of the $Ti_2Co$ intermetallics criteria. Such compositions 10 are also likely to have a low occurrence of voids from solidification shrinkage since the solidification temperature range was consequentially controlled.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of titanium-based alloy compositions, additively manufactured components, additive manufacturing systems, and methods, according to the present disclosure, are presented in the following enumerated paragraphs. It is within the scope of the present disclosure that an individual step of a method recited herein, including in the following enumerated paragraphs, may additionally or alternatively be referred to as a "step for" performing the recited action.

A1. A titanium-based alloy composition (10) including, comprising, consisting of, or consisting essentially of:

at least 4 weight percent (wt %) and at most 6.5 wt % aluminum (20);

at least 1.5 wt % and at most 4.5 wt % vanadium (30);

at least 1.3 wt % and at most 2.1 wt % cobalt (40);

a metallic solute (50), wherein:

(i) the metallic solute (50) includes, consists of, or consists essentially of at least two of tin, chromium, iron, copper, and nickel; and (ii) the composition (10) includes, consists of, or consists essentially of at most 4.5 wt % of the metallic solute (50); and Titanium (60), optionally wherein at least one of:

(i) the composition (10) includes, consists of, or consists essentially of at least 83.5 wt % titanium (60);

(ii) the composition (10) includes, consists of, or consists essentially of at most 90.5 wt % titanium (60);

(iii) the balance of the composition (10) is titanium (60); and (iv) the balance of the composition (10) is titanium (60) and incidental impurities.

A2. The composition (10) of paragraph A1, wherein the composition (10) includes, consists of, or consists essentially of:

(i) at least 4.25 wt %, at least 4.5 wt %, at least 4.75 wt %, at least 5 wt %, at least 5.25 wt %, or at least 5.5 wt % aluminum (20); and (ii) at most 6.25 wt %, at most 6 wt %, at most 5.75 wt %, at most 5.5 wt %, at most 5.25 wt %, or at most 5 wt % aluminum (20).

A3. The composition (10) of any of paragraphs A1-A2, wherein the composition (10) includes, consists of, or consists essentially of:

(i) at least 1.75 wt %, at least 2 wt %, at least 2.25 wt %, at least 2.5 wt %, at least 2.75 wt %, at least 3 wt %, at least 3.25 wt %, or at least 3.5 wt %, vanadium (30); and (ii) at most 4.25 wt %, at most 4 wt %, at most 3.75 wt %, at most 3.5 wt %, at most 3.25 wt %, at most 3 wt %, at most 2.75 wt %, or at most 2.5 wt % vanadium (30).

A4. The composition (10) of any of paragraphs A1-A3, wherein the composition (10) includes, consists of, or consists essentially of:

(i) at least 1.35 wt %, at least 1.4 wt %, at least 1.5 wt %, at least 1.6 wt %, or at least 1.65 wt % cobalt (40); and (ii) at most 2 wt %, at most 1.9 wt %, at most 1.8 wt %, at most 1.7 wt %, at most 1.65 wt %, or at least 1.6 wt % cobalt (40).

A5. The composition (10) of any of paragraphs A1-A4, wherein the metallic solute (50) includes at least three, at least four, or all of tin, chromium, iron, copper, and nickel.

A6. The composition (10) of any of paragraphs A1-A5, wherein the composition (10) includes, consists of, or consists essentially of at least one of:

(i) at least 1.2 wt %, at least 1.4 wt %, at least 1.6 wt %, at least 1.8 wt %, at least 2 wt %, at least 2.2 wt %, at least 2.35 wt %, at least 2.4 wt %, at least 2.6 wt %, at least 2.8 wt %, at least 3 wt %, at least 3.2 wt %, at least 3.4 wt %, at least 3.5 wt %, or at least 3.6 wt % of the metallic solute (50); and (ii) at most 4.4 wt %, at most 4.2 wt %, at most 4 wt %, at most 3.8 wt %, at most 3.6 wt %, at most 3.4 wt %, at most 3.35 wt %, at most 3.2 wt %, at most 3 wt %, at most 2.8 wt %, at most 2.6 wt %, at most 2.4 wt %, at most 2.2 wt %, or at most 2 wt % of the metallic solute (50).

A7. The composition (10) of any of paragraphs A1-A6, wherein the metallic solute (50) includes tin, and optionally wherein the composition (10) includes, consists of, or consists essentially of at least one of:

(i) at least 0.01 wt %, at least 0.05 wt %, at least 0.1 wt %, at least 0.2 wt %, at least 0.4 wt %, at least 0.6 wt %, at least 0.8 wt %, at least 1 wt %, at least 1.2 wt %, at least 1.4 wt %, at least 1.6 wt %, at least 1.8 wt %, at least 2 wt %, at least 2.2 wt %, at least 2.4 wt %, at least 2.6 wt %, or at least 2.8 wt % tin; and (ii) at most 3.2 wt %, at most 3 wt %, at most 2.8 wt %, at most 2.6 wt %, at most 2.4 wt %, at most 2.2 wt %, at most 2 wt %, at most 1.8 wt %, at most 1.6 wt %, at most 1.4 wt %, or at most 1.2 wt % tin.

A8. The composition (10) of any of paragraphs A1-A7, wherein the metallic solute (50) includes chromium, and optionally wherein the composition (10) includes, consists of, or consists essentially of at least one of:

(i) at least 0.01 wt %, at least 0.05 wt %, at least 0.1 wt %, at least 0.2 wt %, at least 0.4 wt %, at least 0.6 wt %, at least 0.7 wt %, at least 0.8 wt %, at least 1 wt %, at least 1.2 wt %, at least 1.4 wt %, at least 1.6 wt %, or at least 1.8 wt % chromium; and (ii) at most 2.2 wt %, at most 2 wt %, at most 1.8 wt %, at most 1.6 wt %, at most 1.4 wt %, at most 1.3 wt %, or at most 1.2 wt % chromium.

A9. The composition (10) of any of paragraphs A1-A8, wherein the metallic solute (50) includes iron, and optionally wherein the composition (10) includes, consists of, or consists essentially of at least one of:

(i) at least 0.01 wt %, at least 0.05 wt %, at least 0.1 wt %, at least 0.2 wt %, at least 0.3 wt %, at least 0.4 wt %, at least 0.5 wt %, at least 0.6 wt %, at least 0.65 wt %, or at least 0.7 wt % iron; and (ii) at most 1 wt %, at most 0.95 wt %, at most 0.9 wt %, at most 0.8 wt %, at most 0.7 wt %, or at most 0.6 wt %, at least 0.5 wt %, or at most 0.4 wt % iron.

A10. The composition (10) of any of paragraphs A1-A9, wherein the metallic solute (50) includes copper, and optionally wherein the composition (10) includes, consists of, or consists essentially of at least one of:

(i) at least 0.01 wt %, at least 0.05 wt %, at least 0.1 wt %, at least 0.15 wt %, at least 0.2 wt %, at least 0.3 wt %, at least 0.4 wt %, at least 0.45 wt %, or at least 0.5 wt % copper; and (ii) at most 0.8 wt %, at most 0.75 wt %, at most 0.7 wt %, at most 0.6 wt %, at most 0.5 wt %, at most 0.45 wt %, or at most 0.4 wt % copper.

A11. The composition (10) of any of paragraphs A1-A10, wherein the metallic solute (50) includes nickel, and optionally wherein the composition (10) includes, consists of, or consists essentially of at least one of:

(i) at least 0.01 wt %, at least 0.05 wt %, at least 0.1 wt %, at least 0.2 wt %, at least 0.3 wt %, or at least 0.4 wt % nickel; and (ii) at most 0.8 wt %, at most 0.7 wt %, at most 0.6 wt %, or at most 0.5 wt % nickel.

A12. The composition (10) of any of paragraphs A1-A11, wherein the composition (10) includes, consists of, or consists essentially of at least one of:

(i) at least 84 wt %, at least 84.5 wt %, at least 85 wt %, at least 85.5 wt %, at least 86 wt %, at least 86.5 wt %, at least 87 wt %, or at least 87.5 wt % titanium (60); and (ii) at most 90 wt %, at most 89.5 wt %, at most 89 wt %, at most 88.5 wt %, at most 88 wt %, at most 87.5 wt %, or at most 87 wt % titanium (60).

A13. The composition (10) of any of paragraphs A1-A12, wherein the composition (10) defines a metallic solid with an equiaxed, or at least substantially equiaxed, microstructure.

A14. The composition (10) of any of paragraphs A1-A13, wherein the metallic solute (50) includes chromium and iron.

A15. The composition (10) of paragraph A14, wherein the metallic solute (50) further includes copper.

A16. The composition (10) of paragraph A15, wherein the composition (10) includes, consists of, or consists essentially of at least 0.15 wt % copper.

A17. The composition (10) of any of paragraphs A15-A16, wherein the composition (10) includes, consists of, or consists essentially of at most 0.45 wt % copper.

A18. The composition (10) of any of paragraphs A14-A17, wherein the composition (10) includes, consists of, or consists essentially of at least 3.5 wt % vanadium (30).

A19. The composition (10) of any of paragraphs A14-A18, wherein the composition (10) includes, consists of, or consists essentially of at least 1.35 wt % cobalt (40).

A20. The composition (10) of any of paragraphs A14-A19, wherein the composition (10) includes, consists of, or consists essentially of at most 1.65 wt % cobalt (40).

A21. The composition (10) of any of paragraphs A14-A20, wherein the composition (10) includes, consists of, or consists essentially of at least 0.8 wt % chromium.

A21.1 The composition (10) of any of paragraphs A14-A21, wherein the composition (10) includes, consists of, or consists essentially of at most 1.2 wt % chromium.

A22. The composition (10) of any of paragraphs A14-A21.1, wherein the composition (10) includes, consists of, or consists essentially of at least 0.65 wt % iron.

A22.1 The composition (10) of any of paragraphs A14-A22, wherein the composition (10) includes, consists of, or consists essentially of at most 0.95 wt % iron.

A23. The composition (10) of any of paragraphs A14-A22.1, wherein the composition (10) includes, consists of, or consists essentially of at least 5.5 wt % aluminum (20).

A24. The composition (10) of any of paragraphs A1-A13, wherein the metallic solute (50) includes chromium and iron.

A25. The composition (10) of paragraph A24, wherein the metallic solute (50) further includes copper.

A26. The composition (10) of paragraph A25, wherein the composition (10) includes, consists of, or consists essentially of at least 0.45 wt % copper.

A27. The composition (10) of any of paragraphs A25-A26, wherein the composition (10) includes, consists of, or consists essentially of at most 0.75 wt % copper.

A28. The composition (10) of any of paragraphs A24-A27, wherein the composition (10) includes, consists of, or consists essentially of at least 2.5 wt % vanadium (30).

A29. The composition (10) of any of paragraphs A24-A28, wherein the composition (10) includes, consists of, or consists essentially of at most 3.5 wt % vanadium (30).

A30. The composition (10) of any of paragraphs A24-A29, wherein the composition (10) includes, consists of, or consists essentially of at least 1.35 wt % cobalt (40).

A31. The composition (10) of any of paragraphs A24-A30, wherein the composition (10) includes, consists of, or consists essentially of at most 1.65 wt % cobalt (40).

A32. The composition (10) of any of paragraphs A24-A31, wherein the composition (10) includes, consists of, or consists essentially of at least 1.8 wt % chromium.

A32.1 The composition (10) of any of paragraphs A24-A32, wherein the composition includes, consists of, or consists essentially of at most 2.2 wt % chromium.

A33. The composition (10) of any of paragraphs A24-A32.1 wherein the composition (10) includes, consists of, or consists essentially of at least 0.1 wt % iron.

A34. The composition (10) of any of paragraphs A24-A33, wherein the composition (10) includes, consists of, or consists essentially of at most 0.4 wt % iron.

A35. The composition (10) of any of paragraphs A24-A34, wherein the composition (10) includes, consists of, or consists essentially of at most 5 wt % aluminum (20).

A36. The composition (10) of any of paragraphs A1-A13, wherein the metallic solute (50) includes tin and chromium.

A37. The composition (10) of paragraph A36, wherein the composition (10) includes, consists of, or consists essentially of at least 2.8 wt % tin.

A37.1 The composition (10) of any of paragraphs A36-A37, wherein the composition (10) includes, consists of, or consists essentially of at most 3.2 wt % tin.

A38. The composition (10) of any of paragraphs A36-A37.1, wherein the composition (10) includes, consists of, or consists essentially of at least 0.7 wt % chromium.

A38.1 The composition (10) of any of paragraphs A36-A38, wherein the composition (10) includes, consists of, or consists essentially of at most 1.3 wt % chromium.

A39. The composition (10) of any of paragraphs A36-A38.1, wherein the composition (10) includes, consists of, or consists essentially of at most 5.25 wt % aluminum (20).

A40. The composition (10) of any of paragraphs A36-A39, wherein the composition (10) includes, consists of, or consists essentially of at least 3.5 wt % vanadium (30).

A41. The composition (10) of any of paragraphs A36-A40, wherein the composition (10) includes, consists of, or consists essentially of at least 1.5 wt % cobalt (40).

A42. The composition (10) of any of paragraphs A1-A13, wherein the metallic solute (50) includes tin and nickel.

A43. The composition (10) of paragraph A42, wherein the composition (10) includes, consists of, or consists essentially of at least 0.8 wt % tin.

A44. The composition (10) of any of paragraphs A42-A43, wherein the composition (10) includes, consists of, or consists essentially of at most 1.2 wt % tin.

A45. The composition (10) of any of paragraphs A42-A44, wherein the composition (10) includes, consists of, or consists essentially of at least 0.4 wt % nickel.

A46. The composition (10) of any of paragraphs A42-A45, wherein the composition (10) includes, consists of, or consists essentially of at most 0.8 wt % nickel.

A47. The composition (10) of any of paragraphs A42-A46, wherein the composition (10) includes, consists of, or consists essentially of at least 5.5 wt % aluminum (20).

A48. The composition (10) of any of paragraphs A42-A47, wherein the composition (10) includes, consists of, or consists essentially of at most 2.5 wt % vanadium (30).

A49. The composition (10) of any of paragraphs A42-A48, wherein the composition (10) includes, consists of, or consists essentially of at most 1.7 wt % cobalt (40).

B1. An additively manufactured component (100), comprising:

a metallic solid that includes, consists of, or consists essentially of the titanium-based alloy composition (10) of any of paragraphs A1-A49.

B2. The additively manufactured component (100) of paragraph B1, wherein the additively manufactured component (100) is a component of an aircraft (110).

C1. An additive manufacturing system (200), comprising:

a supply (210) of feedstock material (212) that includes, consists of, or consists essentially of the titanium-based alloy composition (10) of any of paragraphs A1-A49;

an energy source (220) configured to selectively melt a melted fraction of the feedstock material (212) to form a melt pool (230) of the feedstock material (212), wherein the melt pool (230) of the feedstock material (212) subsequently solidifies to define a corresponding region of an additively manufactured component (100); and a scanning structure (240) configured to selectively change a location of the melt pool (230) of the feedstock material (212) relative to a previously formed portion (102) of the additively manufactured component (100).

C2. The additive manufacturing system (200) of paragraph C1, wherein the additive manufacturing system (200) includes at least one of a directed energy deposition system, a wire feed system, a powder feed system, and a powder bed fusion system.

D1. A method of additively manufacturing an additively manufactured component (100), the method comprising:

melting a melted fraction of a feedstock material (212) to form a melt pool (230) of the feedstock material (212), wherein the feedstock material (212) includes, consists of, or consists essentially of the titanium-based alloy composition (10) of any of paragraphs A1-A49;

cooling the melt pool (230) of the feedstock material (212) to define a corresponding region of the additively manufactured component (100); and selectively varying a location (104) of the melt pool (230), relative to a previously formed portion (102) of the additively manufactured component (100), to define the additively manufactured component (100).

INDUSTRIAL APPLICABILITY

The compositions, additively manufactured components, additive manufacturing systems, and methods disclosed herein are applicable to the additive manufacturing and additively manufactured component industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A titanium-based alloy composition comprising of:

at least 4 weight percent (wt %) and at most 6.5 wt % aluminum;

at least 1.5 wt % and at most 4.5 wt % vanadium;

at least 1.3 wt % and at most 2.1 wt % cobalt;

a metallic solute, wherein:

(i) the metallic solute includes at least two of tin, chromium, iron, copper, and nickel; and (ii) the composition includes at most 4.5 wt % of the metallic solute; and titanium;

wherein the metallic solute includes chromium and iron, and wherein the metallic solute further includes at least 0.15 wt % copper and at most 0.75 wt % copper.

2. The composition of claim 1, wherein the composition includes at least 83.5 wt % titanium and at most 90.5 wt % titanium.

3. The composition of claim 1, wherein the composition defines a metallic solid with an equiaxed microstructure.

4. The composition of claim 1, wherein the composition includes at least 2.5 wt % vanadium and at most 1.65 wt % cobalt.

5. The composition of claim 4, wherein the composition includes:

(i) at least 0.8 wt % and at most 1.2 wt % chromium;

(ii) at least 0.65 wt % and at most 0.95 wt % iron; and (iii) at least 5.5 wt % aluminum.

6. The composition of claim 4, wherein the composition includes:

(i) at least 1.8 wt % and at most 2.2 wt % chromium;

(ii) at most 0.4 wt % iron; and (iii) at most 5 wt % aluminum.

7. The composition of claim 6, wherein the composition includes at least 0.1 wt % iron.

8. An additively manufactured component, comprising:

a metallic solid that consists essentially of the titanium-based alloy composition of claim 1.

9. The additively manufactured component of claim 8, wherein the additively manufactured component is a component of an aircraft.

10. An additive manufacturing system, comprising:

a supply of feedstock material that consists essentially of the titanium-based alloy composition of claim 1;

an energy source configured to selectively melt a melted fraction of the feedstock material to form a melt pool of the feedstock material, wherein the melt pool of the feedstock material subsequently solidifies to define a corresponding region of an additively manufactured component; and a scanning structure configured to selectively change a location of the melt pool of the feedstock material relative to a previously formed portion of the additively manufactured component.

11. A method of additively manufacturing an additively manufactured component, the method comprising:

melting a melted fraction of a feedstock material to form a melt pool of the feedstock material, wherein the feedstock material consists essentially of the titanium-based alloy composition of claim 1;

cooling the melt pool of the feedstock material to define a corresponding region of the additively manufactured component; and selectively varying a location of the melt pool, relative to a previously formed portion of the additively manufactured component, to define the additively manufactured component.

12. A titanium-based alloy composition comprising of:

at least 4 weight percent (wt %) and at most 5.25 wt % aluminum;

at least 3.5 wt % and at most 4.5 wt % vanadium;

at least 1.5 wt % and at most 2.1 wt % cobalt;

a metallic solute, wherein:

(i) the metallic solute includes at least two of tin, chromium, iron, copper, and nickel; and (ii) the composition includes at most 4.5 wt % of the metallic solute; and titanium;

wherein the metallic solute includes at least 2.8 wt % and at most 3.2 wt % tin, and further wherein the metallic solute includes at least 0.7 wt % and at most 1.3 wt % chromium.

13. The composition of claim 12, wherein the composition includes at least 83.5 wt % titanium and at most 90.5 wt % titanium.

14. The composition of claim 12, wherein the composition defines a metallic solid with an equiaxed microstructure.

15. An additively manufactured component, comprising:

a metallic solid that consists essentially of the titanium-based alloy composition of claim 12.

16. The additively manufactured component of claim 15, wherein the additively manufactured component is a component of an aircraft.

17. An additive manufacturing system, comprising:

a supply of feedstock material that consists essentially of the titanium-based alloy composition of claim 12;

an energy source configured to selectively melt a melted fraction of the feedstock material to form a melt pool of the feedstock material, wherein the melt pool of the feedstock material subsequently solidifies to define a corresponding region of an additively manufactured component; and a scanning structure configured to selectively change a location of the melt pool of the feedstock material relative to a previously formed portion of the additively manufactured component.

18. A method of additively manufacturing an additively manufactured component, the method comprising:

melting a melted fraction of a feedstock material to form a melt pool of the feedstock material, wherein the feedstock material consists essentially of the titanium-based alloy composition of claim 12;

cooling the melt pool of the feedstock material to define a corresponding region of an additively manufactured component; and selectively varying a location of the melt pool, relative to a previously formed portion of the additively manufactured component, to define the additively manufactured component.

19. A titanium-based alloy composition comprising of:

at least 4 weight percent (wt %) and at most 5.5 wt % aluminum;

at least 2.5 wt % and at most 4.5 wt % vanadium;

at least 1.3 wt % and at most 1.65 wt % cobalt;

a metallic solute, wherein:

(i) the metallic solute includes at least two of tin, chromium, iron, copper, and nickel; and (ii) the composition includes at most 4.5 wt % of the metallic solute; and titanium;

wherein the metallic solute includes at least 0.8 wt % and at most 1.2 wt % chromium;

wherein the metallic solute includes at least 0.65 wt % and at most 0.95 wt % iron; and wherein the metallic solute further includes at most 0.75 wt % copper.

20. An additive manufacturing system, comprising:

a supply of feedstock material that consists essentially of the titanium-based alloy composition of claim 19;

an energy source configured to selectively melt a melted fraction of the feedstock material to form a melt pool of the feedstock material, wherein the melt pool of the feedstock material subsequently solidifies to define a corresponding region of an additively manufactured component; and a scanning structure configured to selectively change a location of the melt pool of the feedstock material relative to a previously formed portion of the additively manufactured component.

* * * * *